(12) United States Patent
Arora et al.

(10) Patent No.: US 9,213,806 B2
(45) Date of Patent: Dec. 15, 2015

(54) MANAGING AND PROVIDING ACCESS TO APPLICATIONS IN AN APPLICATION-STORE MODULE

(71) Applicant: Bank of America Corporation, Charlotte, NC (US)

(72) Inventors: Manoj Arora, East Brunswick, NJ (US); Devi Shanmuga Kumar, West Windsor, NJ (US); Venkat Pillay, Robbinsville, NJ (US); Paulo Resende, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 313 days.

(21) Appl. No.: 13/672,324

(22) Filed: Nov. 8, 2012

(65) Prior Publication Data
US 2014/0130134 A1    May 8, 2014

(51) Int. Cl.
*H04L 29/06* (2006.01)
*G06F 21/00* (2013.01)

(52) U.S. Cl.
CPC ..................................... *G06F 21/00* (2013.01)

(58) Field of Classification Search
CPC ......... G06F 15/177; G06F 21/00; G06F 8/61; G06F 2221/2141; G06F 21/30; G06F 21/31; G06F 21/335; G06F 2221/2113; G06F 21/62; G06F 21/6218; H04L 63/08; H04L 63/10; H04L 63/102
USPC .......................................................... 726/4, 2
See application file for complete search history.

(56) References Cited

U.S. PATENT DOCUMENTS

| | | | |
|---|---|---|---|
| 6,510,466 B1 | 1/2003 | Cox et al. | |
| 6,604,140 B1 | 8/2003 | Beck et al. | |
| 6,993,588 B2 | 1/2006 | Davis et al. | |
| 7,305,254 B2 | 12/2007 | Findikli | |
| 7,480,907 B1 | 1/2009 | Marolia et al. | |
| 7,543,118 B1 | 6/2009 | Chen et al. | |
| 7,716,276 B1 | 5/2010 | Ren et al. | |
| 7,962,512 B1 * | 6/2011 | Sholtis et al. | 707/777 |
| 8,285,840 B2 | 10/2012 | Dobroth et al. | |
| 2004/0014468 A1 | 1/2004 | Walling | |
| 2007/0074201 A1 * | 3/2007 | Lee | 717/173 |
| 2011/0209201 A1 * | 8/2011 | Chollat | 726/4 |
| 2012/0084186 A1 | 4/2012 | Brown et al. | |
| 2012/0130782 A1 | 5/2012 | Ratnakar | |

(Continued)

OTHER PUBLICATIONS

Andreas Constantinou, *The Mobile Application Store phenomenon*, http://www.visionmobile.com/blog/2008/11/the-mobile-application-store-phenomenon/; 17 pgs., Nov. 14, 2008.

(Continued)

*Primary Examiner* — Ali Abyaneh
(74) *Attorney, Agent, or Firm* — Michael A. Springs

(57) ABSTRACT

According to one embodiment, a system includes an interface and a processor. The interface receives, from a device, a request to access an application-store module, the device being associated with a first user. The processor determines a device type associated with the device; determines an operating system associated with the device; determines a user role associated with the first user; and determines, based on the device type, the operating system, and the user role, one or more applications. The interface communicates, to the device, a first set of information to be displayed on the device, the first set of information being associated with the one or more applications.

17 Claims, 7 Drawing Sheets

(56) References Cited

U.S. PATENT DOCUMENTS

2012/0159567 A1* 6/2012 Toy et al. .......................... 726/1
2014/0019958 A1* 1/2014 Sherman ....................... 717/178

OTHER PUBLICATIONS

Sarah Perez, *The Truth about Mobile Application Stores*, http://www.readwriteweb.com/archives/the_truth_about_mobile_application_stores.php; 4 pgs., Feb. 22, 2010.

* cited by examiner

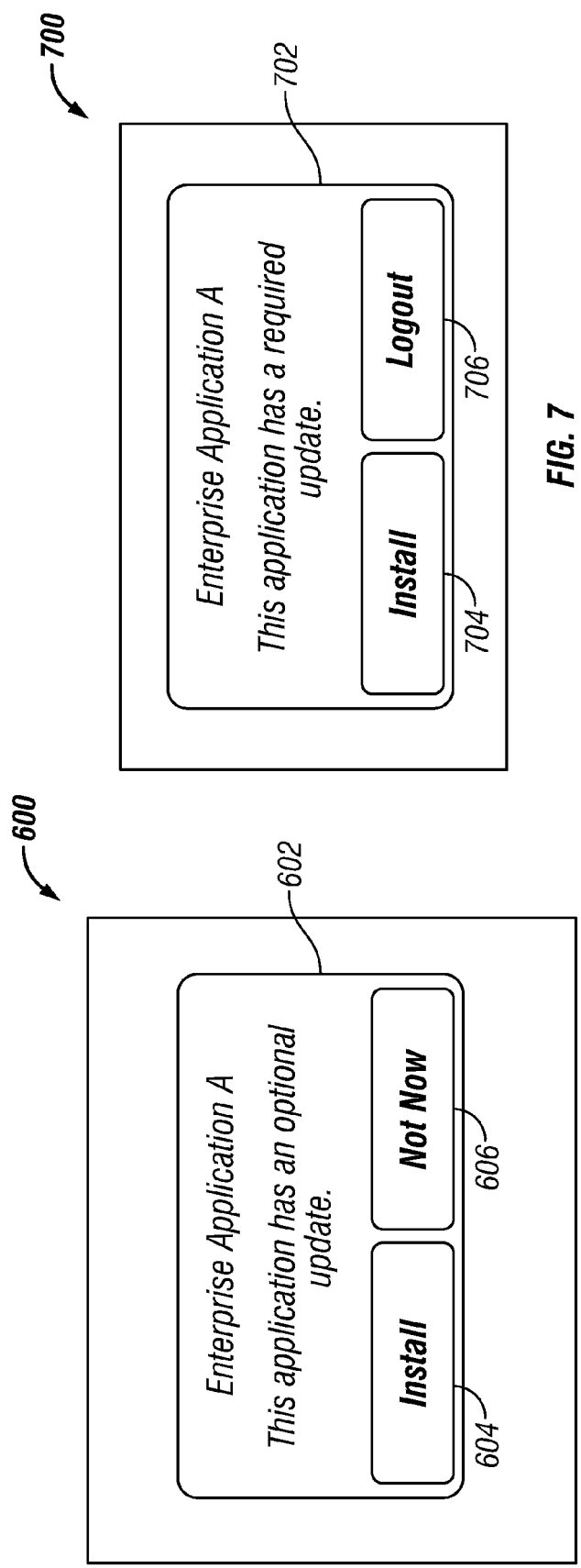

MANAGING AND PROVIDING ACCESS TO APPLICATIONS IN AN APPLICATION-STORE MODULE

TECHNICAL FIELD

This disclosure relates generally to managing and providing access to applications in an application-store module, and more specifically to managing and providing access to applications in an application-store module with applications for use on devices.

BACKGROUND

In certain industries, an entity may manage and provide access to applications in an application-store module. However, when the applications are for use on devices and the devices are of various types, run various operating systems, and are used by users of various user roles, unwanted compatibility and security issues may arise.

SUMMARY

According to certain embodiments of the present disclosure, disadvantages and problems associated with previous systems for managing and providing access to applications in an application-store module with applications for use on devices may be reduced or eliminated.

According to one embodiment, a system includes a processor and an interface. The interface receives, from a device, a request to access an application-store module. The device is associated with a user. The processor determines a device type associated with the device, an operating system associated with the device, and a user role associated with the user. The processor determines, based on the device type, operating system, and user role, one or more applications. The interface communicates a set of information to be displayed on the device. The set of information is associated with the one or more applications.

Certain embodiments of the disclosure may provide one or more technical advantages. For example, determining device type and operating system, determining one or more applications associated with the device type and operating system, and providing the associated applications may have the advantage of only allowing access to applications compatible with the device type and operating system being used. This may have the advantage of avoiding attempted access to incompatible applications. As another example, determining available applications based on device type, operating system, and user role may limit the processing and storage resources needed by the system by only displaying appropriate applications on a user's device.

Certain embodiments of the disclosure may also provide one or more security advantages. For example, determining user role, determining one or more applications associated with the user role, and providing the associated applications may have the advantage of only allowing access to applications for which users have an appropriate user role. This may have the advantage of avoiding attempted access to applications for which a user does not have authorization.

Certain embodiments of the present disclosure may include some, all, or none of the above advantages. One or more other technical or other advantages may be readily apparent to those skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 6 illustrates an example embodiment of a GUI operable to display information about an optional update for a particular application, according to one embodiment of the present disclosure;

FIG. 7 illustrates an example embodiment of a GUI operable to display information about a required update for a particular application, according to one embodiment of the present disclosure.

DETAILED DESCRIPTION OF THE DRAWINGS

Embodiments of the present disclosure and its advantages are best understood by referring to FIGS. 1 through 8, like numerals being used for like and corresponding parts of the various drawings.

Figure 1:
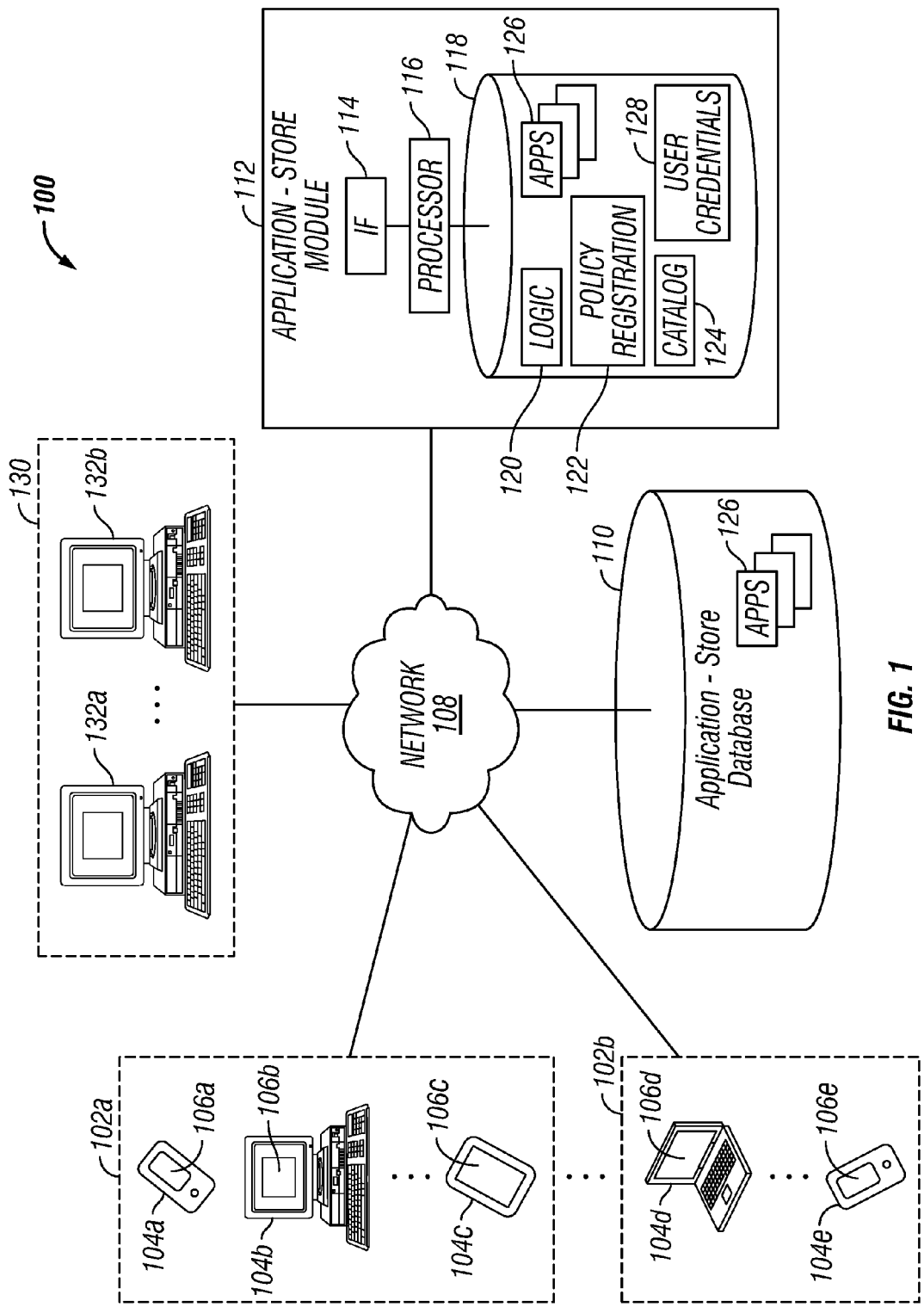
FIG. 1 illustrates a system for facilitating managing and accessing applications in an application-store module with applications for use on devices, according to one embodiment of the present disclosure.

FIG. 1 illustrates system 100 for facilitating managing and accessing applications 126 in an application-store module 112 with applications 126 for use on devices 104, according to one embodiment of the present disclosure.

System 100 coordinates interactions between users 102, node 130, application-store module 112, and application-store database 110. Via the coordination, users 102 may access applications 126 for use on devices 104 and one or more administrators associated with node 130 may manage applications 126 using administrative computers 132.

In the illustrated embodiment, system 100 includes a plurality of users 102, who are each associated with one or more devices 104. Users 102 interact with devices 104 to request access to applications 126. Administrators at node 130 interact with administrative computers 132 to manage applications 126. Application-store module 112 may store logic 120 based on management by administrators and may use logic 120 to process requests to access applications 126. Application-store database 110 may store one or more applications 126 that may be managed and accessed via communication with application-store module 112.

Users 102 represent any suitable person or persons and/or any suitable type of entity in any suitable industry that interacts with devices 104 to access applications 126. User 102a, for example, may be a person, a group of people, an organization, a business, or any other suitable entity.

Devices 104 may comprise any type of mobile or stationary computing device operable to communicate and interact with system 100 and/or any other suitable system. In particular embodiments, devices 104 allow users 102 to access applications 126. Examples of devices 104 include a mobile phone, personal digital assistant, laptop, netbook, ultrabook, tablet, desktop computer, cable box, television, automobile, and/or any other suitable device.

Devices 104 include any necessary hardware and software suitable to carry out their functions. For example, devices 104 may include a processor for executing routines associated with receiving and requesting access to applications 126. A processor included in device 104 may comprise a programmable logic device, a microcontroller, a microprocessor, any suitable processing device, or any suitable combination of the preceding. Device 104 may also include a memory comprising a non-transitory computer-readable medium for storing software and data related to those software programs. Similarly, data may be input from user 102 and stored on device 104 in such a memory. Where appropriate, device 104 may include a network interface to implement communication protocols to allow device 104 to communicate with the other components of system 100.

Device 104 may include any suitable software to carry out its functions. For example, devices 104 may run any suitable operating system such as WINDOWS, MAC-OS, UNIX, LINUX, iOS, Windows Mobile, Android, and/or any other suitable operating system. Devices 104 may also include any suitable native applications, such as a web browser application, a messaging application, and/or a natively-installed client application specifically configured to work with one or more components of system 100.

Certain embodiments of system 100 include device 104a that is a mobile phone, device 104b that is a desktop computer, device 104c that is a tablet computer, and device 104d that is a laptop computer.

In certain embodiments, devices 104 include graphical user interfaces ("GUIs") 106, which may display information associated with user 102 and one or more applications 126. GUIs 106 allow users 102 to request access to one or more applications 126. GUIs 106 are generally operable to tailor and filter data entered by and presented to user 102. GUIs 106 may provide user 102 with an efficient and user-friendly presentation of information. For example, GUI 106a may display information associated with user 102a and provide options for accessing applications 126 associated with user 102a and device 104a. Certain GUIs 106 may comprise a plurality of displays having interactive fields, pull-down lists, and buttons operated by user 102. GUIs 106 may include multiple levels of abstraction including groupings and boundaries. It should be understood that the term GUI may be used in the singular or in the plural to describe one or more GUIs and each of the displays of a particular GUI 106. Example GUIs 106 are described below with respect to FIGS. 2-7.

GUIs 106 may be displayed to user 102 using a web browser that allows user 102 of device 104 to interact with a website, communicatively coupled to system 100 for example, by transmitting information to and receiving information from the website. Suitable web browsers may include Microsoft Internet Explorer®, Mozilla Firefox®, Google Chrome™, Apple Safari™, or Opera®. In certain embodiments, GUIs 106 may be displayed using an application natively installed on each device 104. For example, an enterprise associated with system 100 may create and distribute an application-store application designed for mobile phone device 104a and another application-store application designed for computer device 104b that both operate outside of a web browser. User 102 may install the application-store application on an access device 104 and interact with GUI 106 provided by the application-store application to communicate with and instruct on-line system 100 to perform certain actions. In certain embodiments, GUIs 106 may be provided by a website or native application maintained by a third-party.

Network 108 represents any suitable network that facilitates communication between the components of system 100. Network 108 may include any interconnecting system capable of transmitting audio, video, signals, data, messages, or any combination of the preceding. Network 108 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, any other suitable communication link, including combinations thereof operable to facilitate communication between the components of system 100.

Application-store database 110 may store applications 126 for use by users 102 on devices 104. Administrators at node 130 may use administrative computers 132 to add and remove or decommission applications 126 in application-store database 110 and/or manage access to applications 126 in application-store database 110 via communication with application-store module 112 or via direct communication with application-store database 110. Application-store module 112 may access and manage distribution of applications 126 to devices 104.

Application-store module 112 includes any suitable combination of components that facilitate communication with devices 104, administrative computers 132, and application-store database 110 and allow users 102 of devices 104 to attempt to access one or more applications 126, allow administrators of administrative computers 132 to manage applications 126, and apply management rules set by administrators to applications 126 in application-store database 110.

In particular embodiments, application-store module 112 is operable to determine one or more applications 126, available to particular user 102a on particular device 104a, in response to a request submitted by user 102a on device 104a. Application-store module 112 may include the computing systems controlled by a financial institution, such as a bank, brokerage house, or investment firm. Applications 126 that application-store module 112 controls may be associated with particular device types, operating systems, and user roles and application-store module 112 may restrict access to applications 126 to particular users 102 with particular user roles on particular devices 104 with particular device types and running particular operating systems based on management by administrators. For example, application-store module 112 may be used by administrators to restrict access to particular application 126, designed for use on a particular device type and operating system and by one or more users 102 associated with a particular user role, by only allowing users 102 associated with the particular user role and using the particular device type and operating system to access the particular application 126.

Application-store module 112 may include a network server, any suitable remote server, a mainframe, a host computer, a workstation, a web server, a personal computer, a file, server, or any other suitable device operable to facilitate communicating with devices 104 and processing requests received from devices 104. In some embodiments, application-store module 112 may execute any suitable operating system such as IBM's zSeries/Operating system (z/OS), MS-DOS, PC-DOS, MAC-OS, WINDOWS, UNIX, OPenVMS, Linux, iOS, Android, and/or any other appropriate operating systems, including operating systems developed in the future.

The functions of application-store module 112 may be performed by any suitable combination of one or more servers or other components at one or more locations. In the embodiment where the modules are servers, the servers may be public or private servers, and each server may be a virtual or physical server. The server may include one or more servers at the same or at locations remote from one another.

In certain embodiments, application-store module 112 includes network interface 114, processor 116, and memory 118.

Network interface 114 represents any suitable device operable to receive information from network 108, perform suitable processing of the information, communicate to devices 104, administrative computers 132, and/or application-store database 110, or any combination of the preceding. For example, network interface 114 may receive requests for accessing certain applications 126 from user 102*a* of device 104*a* via network 108. Network interface 114 represents any port or connection, real or virtual, including any suitable hardware and/or software, including protocol conversion and data processing capabilities, to communicate through a LAN, WAN, or other communication systems that allows application-store module 112 to exchange information with the other components of system 100.

Processor 116 communicatively couples to network interface 114 and memory 118. Processor 116 controls the operation and administration of application-store module 112 by processing information received from network interface 114 and memory 118. Processor 116 includes any hardware and/or software that operates to control and process information. For example, processor 116 executes logic 120 in memory 118 to control the operation of application-store module 112. Processor 116 may be a programmable logic device, a microcontroller, a microprocessor, any suitable processing device, or any suitable combination of the preceding.

Memory 118 stores, either permanently or temporarily, data, operational software, rules, or other information for processor 116. Memory 118 includes any one or a combination of volatile or nonvolatile local or remote devices suitable for storing information, such as a non-transitory computer-readable storage medium. For example, memory 118 may include random access memory (RAM), read only memory (ROM), magnetic storage devices, optical storage devices, or any other suitable information storage device or a combination of these devices. While illustrated as including particular modules, memory 118 may include any suitable information for use in the operation of application-store module 112.

In certain embodiments, memory 118 includes logic 120, policy registration 122, catalog 124, applications 126, and user credentials 128.

Logic 120 represents any suitable set of instructions, logic, or code embodied in a non-transitory, computer-readable medium and operable to facilitate the operation of application-store module 112.

Policy registration 122 represents any suitable set of instructions, logic, or code embodied in a non-transitory, computer-readable medium and operable to facilitate presentation and acknowledgement of terms of use associated with application-store module 112.

Catalog 124 represents any suitable set of instructions, logic, or code embodied in a non-transitory, computer-readable medium and operable to facilitate presentation on GUIs 106 and download to devices 104 of particular available applications 126.

User credentials 128 include any suitable logic operable to determine whether user 102 should gain access to application-store module 112. For example, user 102*a* may provide authentication credentials to application-store module 112 using GUI 106. Such credentials may include a username, password, account identifier, access device identifier, and/or any other information suitable to form a basis as to whether user 102*a* should gain access to application-store module 112. As additional examples, authentication credentials may take the form of a facial feature, voice, and/or other biometric data taken with a camera or other input device provided on device 104.

Application-store module 112 may instruct processor 116 to retrieve information stored in user credentials 128 associated with user 102*a*. Processor 116 may compare the stored values with the values provided by the user through GUI 106 in order to determine whether user 102*a* should be permitted access. If the credentials provided by user 102*a* through GUI 106 are not correct, application-store module 112 may include instructions for user 102*a* to make additional attempts to provide suitable credentials for gaining access to application-store module 112. For users 102 that provide suitable credentials for gaining access to application-store module 112, application-store module 112 may specify that the credentials provided by user 102 be stored in memory 118. These may be used, for example, during user 102*a*'s session with application-store module 112, along with other information, to determine which applications 126 should be displayed on GUI 106 for access by user 102*a*. Alternatively, instead of storing the credentials provided by user 102*a* over GUI 106*a*, application-store module 112 may specify that a flag be set in memory 118 that indicates that user 102*a* has successfully gained access to application-store module 112. Such a flag may expire after a certain amount of time and/or when user 102*a* ends a session using application-store module 112. This flag may be checked if, for example, user 102*a* initiates an attempt to access one or more applications 126.

Nodes 130 represent any suitable type of entity in any suitable industry that facilitate access to applications 126 for its users 102. For example, node 130 may be a bank, brokerage house, investment firm, or any other suitable entity. In an embodiment, node 130 includes administrative computers 132 for use by administrators to manage applications 126 for access by users 102.

Administrative computers 132 represent any suitable type of interface for managing applications 126. Administrative computers 132 may be operated by administrators, or in any other suitable manner. Administrative computers 132 include any suitable hardware, software, and/or logic (including a processor) to carry out its reporting operations. Administrative computers 132 represent any components that may display information and receive information for managing applications 126. Administrative computers 132 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 100 in order to display information received from other components of system 100 and input information to be communicated to other components of system 100. Administrative computers 132 may further allow an administrator to request information from other components of system 100 and/or provide information to other components of system 100. Administrative computers 132 may comprise a user interface, such as a display, a microphone, keypad, or other appropriate terminal equipment usable by an administrator.

Administrative computer 132 represents any suitable components that facilitate establishment and/or modification of the configuration of any of the components of application-store module 112 and application-store database 110. An administrative computer 132 to update the rules in logic 120, information in policy registration 122, catalog 124, user credentials 128, applications 126 stored in memory 118 or application-store database 110, or any other suitable information. For example, an administrator may determine the criteria that indicate what users 102 are associated with a certain user role. The administrator may store these directly in memory 118 and/or enable logic 120 to use this criteria to determine user role. Likewise, an administrator may determine which applications 126 should be available for particular combinations of device types, operating systems, user roles, and/or any other suitable criteria. The administrator may create/update logic 120 as appropriate. The administrator may also use administrative computer 132 to add, activate, update, and/or decommission applications 126 in application-store database 110 and/or application-store module 112.

Administrative computer 132 may comprise a network server, any suitable remote server, a mainframe, a host computer, a workstation, a web server, a personal computer, a file, server, or any other suitable device operable to configure the components and rules used by application-store module 112. In some embodiments, administrative computer 132 may execute any suitable operating system such as IBM's z/OS, MS-DOS, PC-DOS, MAC-OS, WINDOWS, UNIX, OPen-VMS, Linux, or any other appropriate operating systems, including operating systems developed in the future. The functions of administrative computer 132 may be performed by any suitable combination of one or more servers or other components at one or more locations. In the embodiment where the modules are servers, the servers may be public or private servers, and each server may be a virtual or physical server. The server may include one or more servers at the same or at locations remote from one another.

In an example embodiment of operation of system 100, user 102a uses GUI 106a of mobile phone device 104a to access application-store module 112. User 102a enters a username and password as access credentials. Logic 120 determines, based on user credentials 128 and the username and password entered by user 102a that user 102a has suitable credentials and allows user 102a to access application-store module 112 and to access one or more applications 126. User 102a may use GUI 106a on device 104a to submit a request to access application-store module 112. For example, user 102a may click or otherwise select an icon on GUI 106a representing application-store module 112. Application-store module 112 may receive the request over network 108 via network interface 114. Application-store module 112 may access information in policy registration 122 and communicate the information, via network interface 114, over network 108 to device 104a for display on GUI 106a. For example, the information may indicate certain terms of use and user 102a may be required to indicate acceptance of the terms and conditions before proceeding to a next screen on GUI 106a. Processor 116 may determine, based on information in the request or in any other suitable manner, a device type associated with device 104a. Processor 116 may also determine, based on information in the request or in any other suitable manner, an operating system that is associated with and currently running on device 104a. Processor 116 may determine, based on the input username and password, information in user credentials 128, information in the request, and/or in any other suitable manner, a user role associated with user 102a. Processor 116 may then determine, based on the determined device type, operating system and user role, one or more appropriate applications 126 to make available in response to the request.

Application-store module 112 may then communicate, via network interface 114 and to device 104a, a set of information indicating particular applications 126 that are available based on the determined device type, operating system, and user role. This information may be used for display on GUI 106a to indicate applications 126 available for download or other access by user 102a on device 104a. Application-store module 112 may also use and/or communicate information in catalog 124 to determine the display of the available applications 126 on GUI 106a. As a result, user 102a may be able to select to access one or more available applications 126.

A component of system 100 may include an interface, logic, memory, and/or other suitable elements. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer-readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 100 without departing from the scope of the disclosure. For example, administrators may be able to use administrative computers 132 to perform additional management functions. Administrators may add new applications 126 to application-store database 110 and/or memory 118. Additionally or alternatively, administrators may decommission applications 126. Administrators may also be able to add required or optional updates. Users 102 may be informed of updates on GUIs 106 and may download or otherwise access updates from application-store module 112 or application-store database 110. Furthermore, the components of system 100 may be integrated or separated. For example, application-store database 110 may be incorporated into application-store module 112.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

Figure 2:
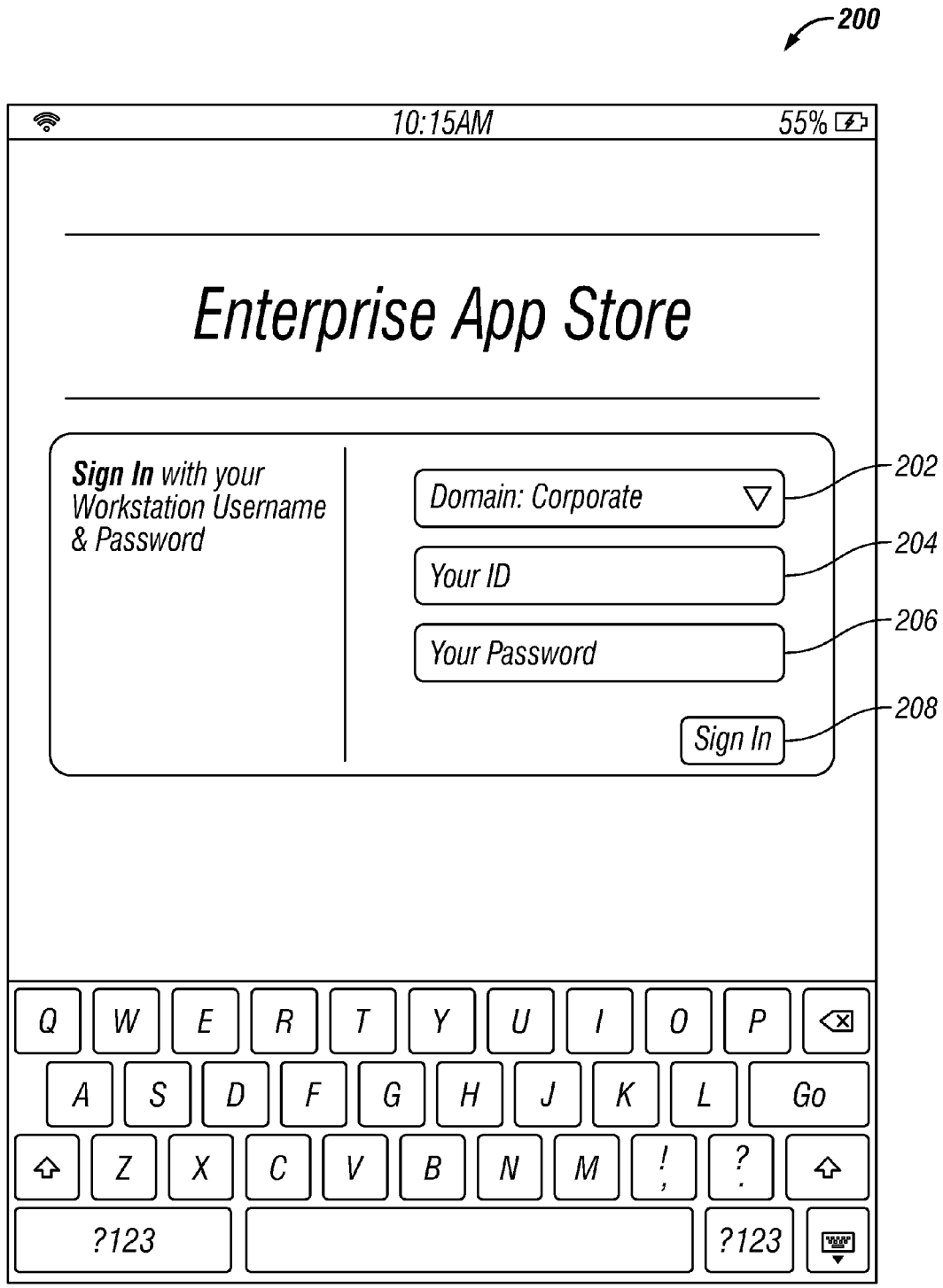
FIG. 2 illustrates an example embodiment of a GUI operable to allow a user to input access credentials, according to one embodiment of the present disclosure.

FIG. 2 illustrates an example embodiment of GUI 200 operable to allow user 102a to input access credentials, according to one embodiment of the present disclosure. In certain embodiments, GUI 200 may be an example of GUI 106 of FIG. 1. Access credentials may include a username, password, domain, and any other suitable information. GUI 200 may appear on device 104 in response to a request to access application-store module 112. For example, user 102a may request to access application-store module 112 by clicking on an icon on GUI 106 associated with application-store module 112. In response to that request, GUI 200 may appear and prompt user 102a to enter access credentials. Domain field 202 may allow user 102a to enter a domain. In the illustrated embodiment, the domain may be "corporate," indicating that user 102a is attempting access as a corporate user. Domain may be any suitable type. For example, domain could be "personal," indicating that user 102a is attempting access as a personal user. ID field 204 may be a field for entering a username or other identification for accessing application-store module 112. In particular embodiments, user 102a may enter an email address in ID field 204. Password field 206 may be a field for entering a password associated with user 102a. The password may be a combination of letters, numbers, and/or symbols previously chosen by or assigned to user 102a. Sign-in button 208 may be a button that user 102 may press, after selecting and/or entering information in domain field 202, ID field 204, and password field 206 in order to prompt application-store module 112 to process the entered information. Application-store module 112 may process the entered information and may allow or deny access to application-store module 112 or perform any suitable action. Application-store module 112 may be operable to grant access to first user 104a at a first time and deny access to second user 104b at a second time based on the entered information. For example, user 102a may enter valid credentials and application-store module 112 may, as a result, grant access to application-store module 112. After some time, device 104a may be left idle or user 102a may actively log out of application-store module 112. User 102b may attempt to access application-store module 112 on device 104a by entering invalid credentials. As a result, application-store module 112 may deny access to application-store module 112.

Modifications, additions, or omissions may be made to GUI 200 without departing from the scope of the disclosure. For example, GUI 200 may include more or fewer fields and/or buttons.

Figure 3:
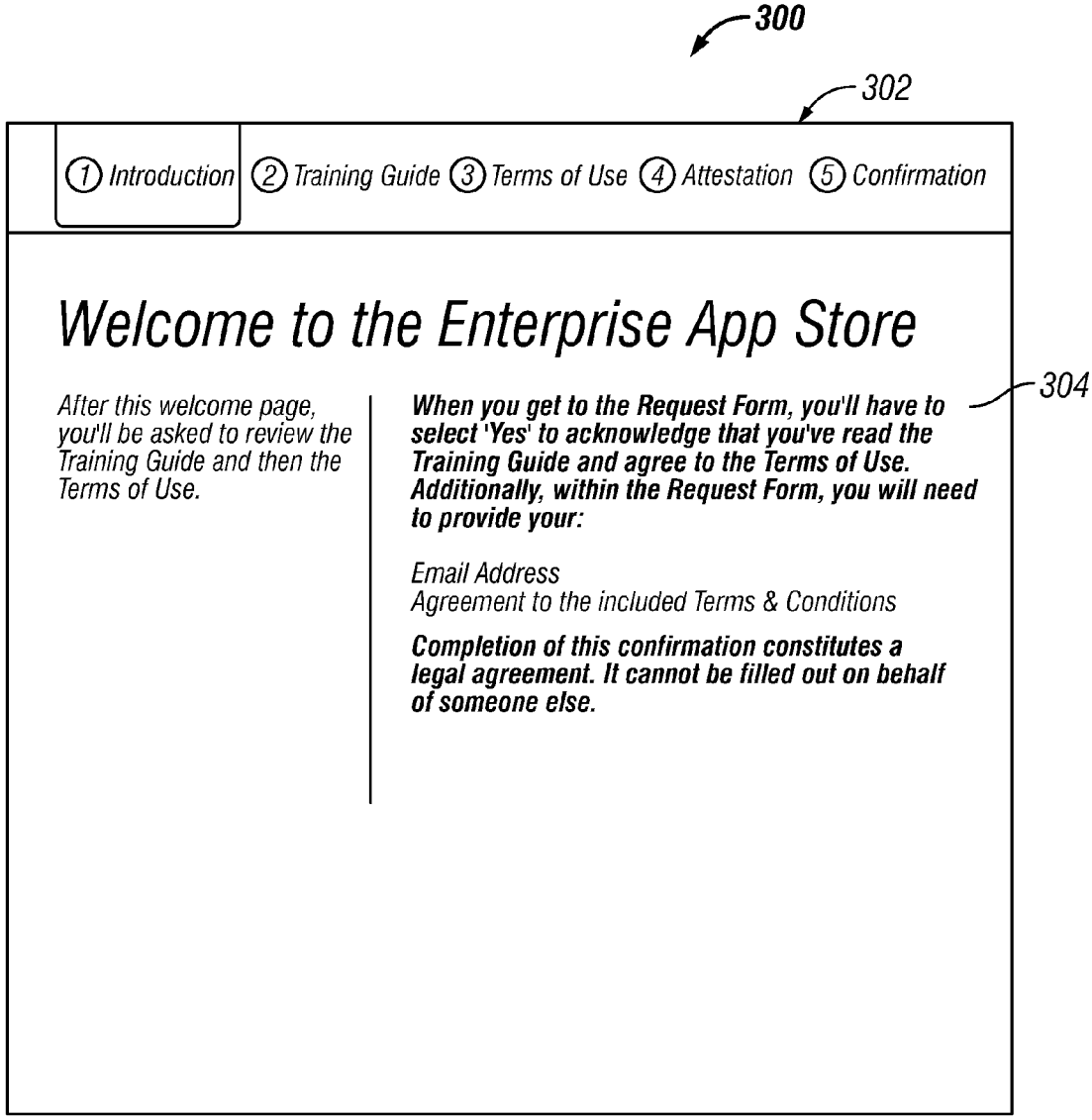
FIG. 3 illustrates an example embodiment of a GUI operable to display an introduction screen, according to one embodiment of the present disclosure.

FIG. 3 illustrates an example embodiment of GUI 300 operable to display an introduction screen, according to one embodiment of the present disclosure. In certain embodiments, GUI 300 may be an example of GUI 106 of FIG. 1. GUI 300 may appear in response to application-store module 112 processing information entered in GUI 200 and determining, based on user credentials 128, that the entered information indicates that user 102 has permission to access application-store module 112. GUI 300 may include navigation bar 302 indicating that the current screen is the "Introduction" screen and may indicate other screens and/or steps that user 102 may expect for a policy-registration process. In the illustrated example, other screens and/or steps include "Training Guide," "Terms of Use," "Attestation," and "Confirmation." In the illustrated example, the indicators of these screens and/or steps include numbers to indicate their order and are also arranged from left to right to indicate order. GUI 300 may include an introductory message 304 indicating the steps to be taken as part of the policy-registration process. For example, in the illustrated example, introductory message 304 indicates that user 102 will be asked to review a "Training Guide" and "Terms of Use," will be asked to confirm review of the "Training Guide" and "Terms of Use," and will be asked to enter an email address and an agreement to the included terms and conditions (terms of use). In the illustrated embodiment, GUI 300 also indicates that completion of the confirmation constitutes a legal agreement and that it cannot be filled out on behalf of someone else. Navigation bar 302 and introductory message 304 may include any other suitable information.

Modifications, additions, or omissions may be made to GUI 300 without departing from the scope of the disclosure. For example, GUI 300 may include additional or less information and/or buttons arranged in different displays.

Figure 4:
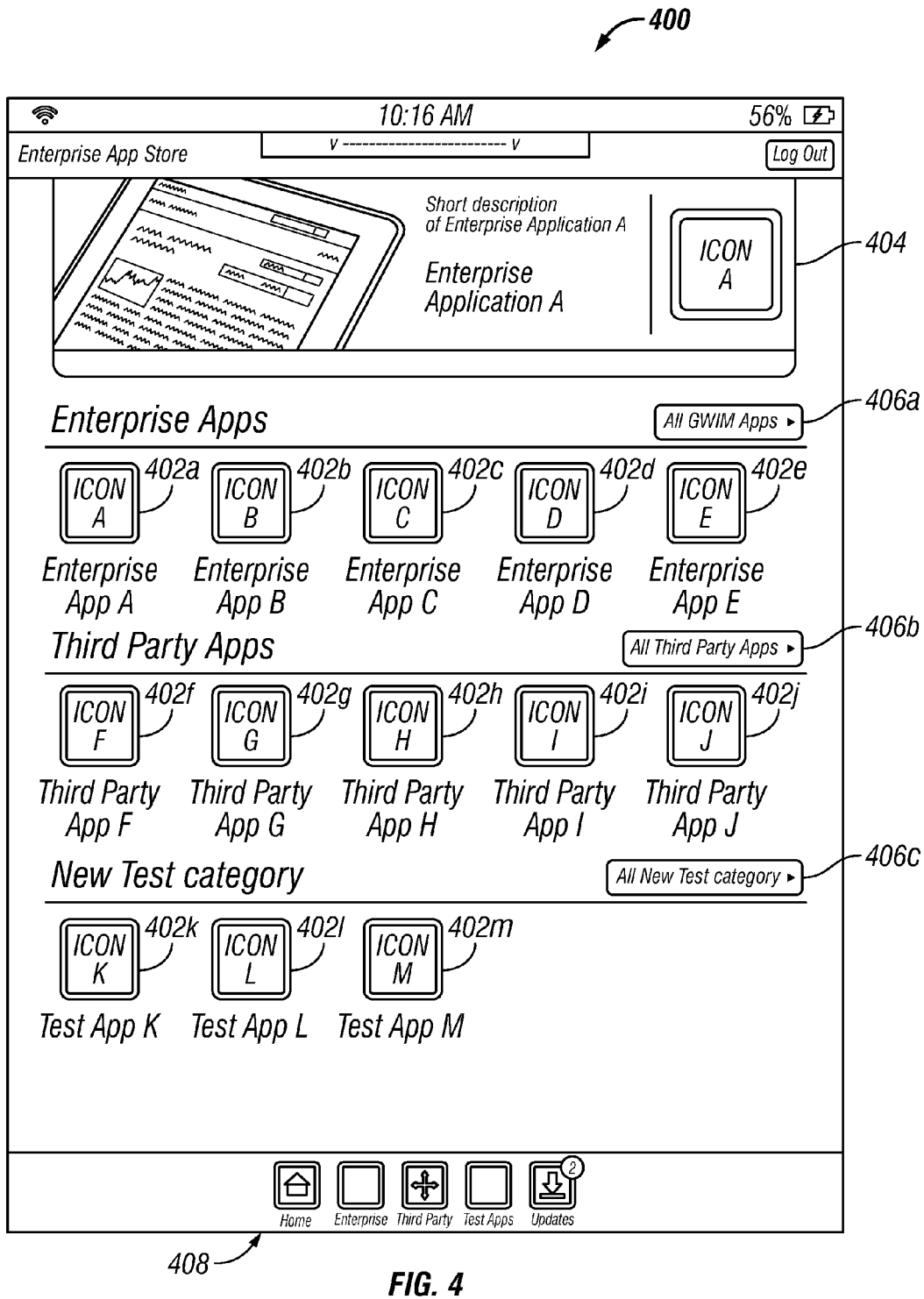
FIG. 4 illustrates an example embodiment of a GUI operable to display one or more available applications, according to one embodiment of the present disclosure.

FIG. 4 illustrates an example embodiment of GUI 400 operable to display one or more available applications 126, according to one embodiment of the present disclosure. In certain embodiments, GUI 400 may be an example of GUI 106 of FIG. 1. GUI 400 may appear after a policy-registration process is completed and after application-store module 112 determines one or more applications 126 that are available for the particular device type, operating system, and user role. GUI 400 may display one or more available applications 126 as icons 402 on GUI 400. Icons 402 may be displayed with an application title. For example, in the illustrated example, icon 402a is associated and displayed with the title "Enterprise App A" to indicate the title of the application 126. Hovering over, scrolling to, or otherwise selecting icon 402a may provide additional information about the associated application 126 in preview bar 404. For example, in the illustrated example, hovering over or scrolling to icon 402a results in additional information, including a short description, about "Enterprise App A" being displayed in preview bar 404. Icons 402 may be arranged based on the type of application 126 they are associated with. For example, in the illustrated example, icons 404 are arranged by "Enterprise Apps," "Third Party Apps," and "New Test Category." "Enterprise Apps" may include applications 126 developed by and/or otherwise associated with node 130. "Third Party Apps" may include applications 126 developed by and/or otherwise associated with a third party. "New Test Category" may include applications 126 that are currently in a trial period. While GUI 400 may include one or more icons 404 associated with applications 126 for each of these categories, buttons 406 may be used to view icons 404 for all available applications 126 in each category. For example, pressing button 406a may result in the display of icons 404 for every available application 126 in the "Enterprise Apps" category. Additionally or alternatively, navigation bar 408 may be used to navigate to pages for each category of applications 126. Navigation bar 408 may also be used to navigate to available updates and/or may indicate a number of updates currently available to user 102 based on applications 126 that have already been downloaded and updates added by administrators or otherwise available for previously downloaded or accessed applications 126.

Modifications, additions, or omissions may be made to GUI 400 without departing from the scope of the disclosure. For example, GUI 400 may include additional or less information and/or buttons arranged in different displays.

Figure 5:
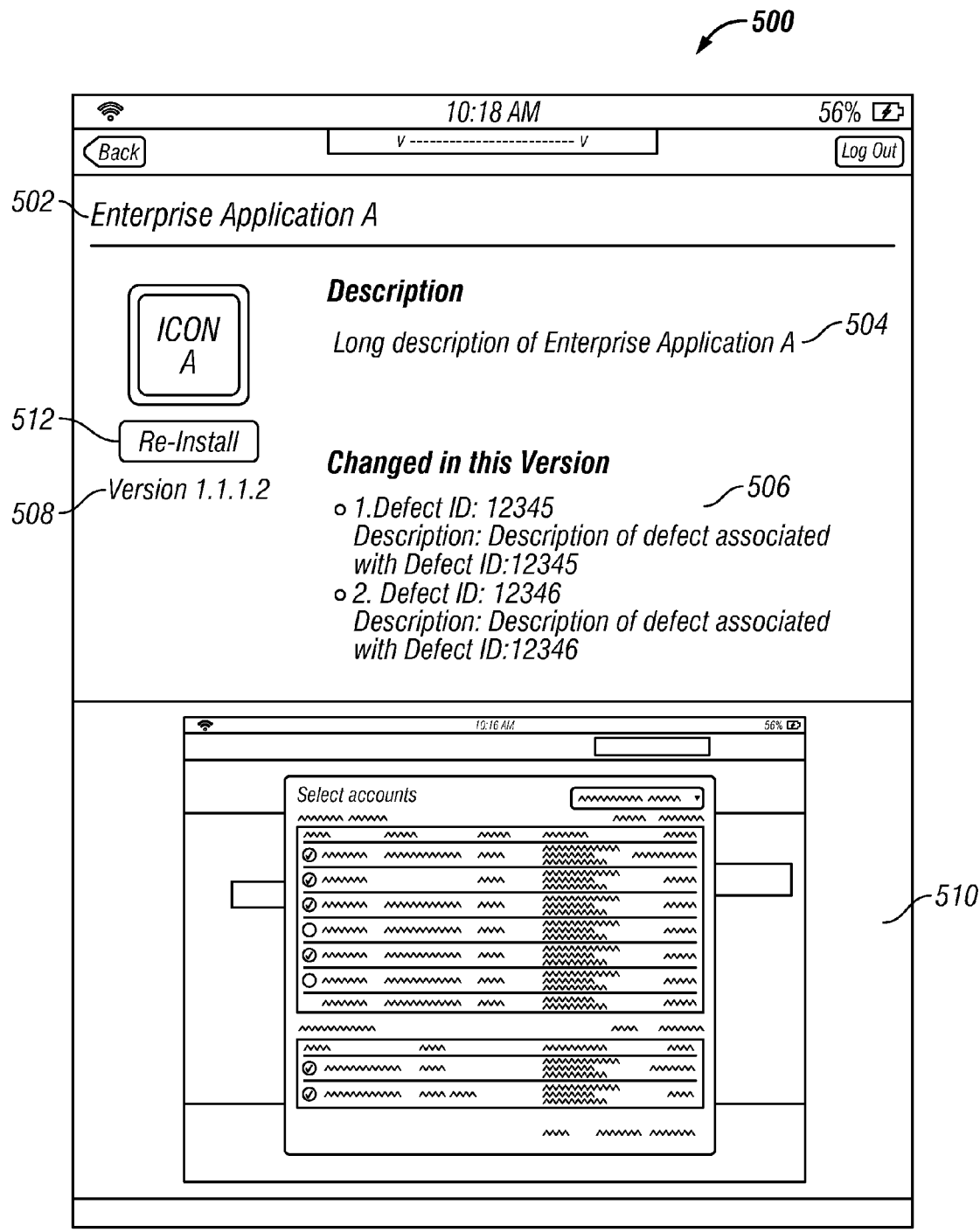
FIG. 5 illustrates an example embodiment of a GUI operable to display information about a particular application, according to one embodiment of the present disclosure.

FIG. 5 illustrates an example embodiment of GUI 500 operable to display information about particular application 126, according to one embodiment of the present disclosure. In certain embodiments, GUI 500 may be an example of GUI 106 of FIG. 1. GUI 500 may appear as a result of selecting particular icon 404a on GUI 400. GUI 500 may display additional information about particular application 126 associated with icon 404a. Title 502 may display the name associated with particular application 126. Description 504 may include a more detailed description of particular application 126 than was available on GUI 400. Version information 506 may describe updates that have been made in different versions of particular application 126. Version number 508 may indicate the particular version that is available for download from GUI 500. Preview 510 may include a preview of a user interface of particular application 126. Install button 512 may allow user 102 to select to install or reinstall particular application 126.

Modifications, additions, or omissions may be made to GUI 500 without departing from the scope of the disclosure. For example, GUI 500 may include additional or less information and/or buttons arranged in different displays.

FIG. 6 illustrates an example embodiment of GUI 600 operable to display information about an optional update for particular application 126, according to one embodiment of the present disclosure. In certain embodiments, GUI 600 may be an example of GUI 106 of FIG. 1. GUI 600 may appear on device 104 when device 104 has a particular application 126 installed and an administrator has added an optional update, for particular application 126, to application-store database 110 and/or application-store module 112 and has indicated that the update is optional and currently available for installation. GUI 600 may appear automatically or may appear when user uses navigation bar 408 on GUI 400 to navigate to available updates. Optional update window 602 may indicate to user 102 that an optional update is available. Install button 604 may allow user 102 to install the available update. Not-now button 606 may allow user 102 to continue without installing the available update.

Modifications, additions, or omissions may be made to GUI 600 without departing from the scope of the disclosure. For example, GUI 600 may include more or fewer fields and/or buttons.

FIG. 7 illustrates an example embodiment of GUI 700 operable to display information about a required update for particular application 126, according to one embodiment of the present disclosure. In certain embodiments, GUI 700 may be an example of GUI 106 of FIG. 1. GUI 700 may appear on device 104 when device 104 has a particular application 126 installed and an administrator has added a required update, for particular application 126, to application-store database 110 and/or application-store module 112 and has indicated that the update is required and currently available for installation. GUI 700 may appear automatically to prompt user 102 to download or otherwise access the required update. Required-update window 702 may indicate to user 102 that a required update is available. Install button 704 may allow user 102 to install the available update. Logout button 706 may allow user 102 to logout of particular application 126. In the illustrated embodiment, user 102 may be forced to install the update or logout and may not be able to continue using the particular application 126 without installing the update.

Modifications, additions, or omissions may be made to GUI 700 without departing from the scope of the disclosure. For example, GUI 700 may include more or fewer fields and/or buttons.

Figure 8:
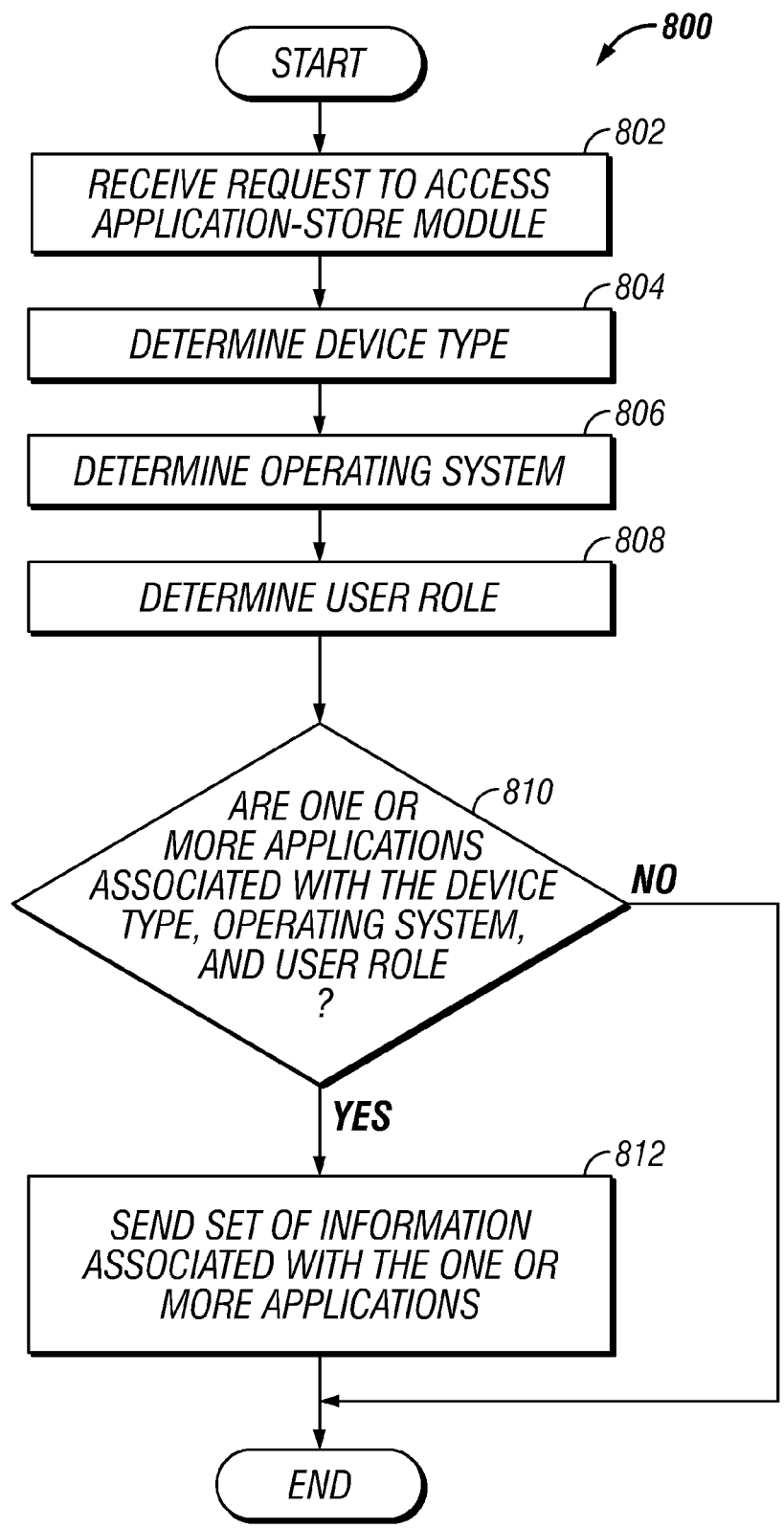
FIG. 8 illustrates an example method for facilitating access to an application-store module by users on devices, according to one embodiment of the present disclosure.

FIG. 8 illustrates an example method 800 for facilitating access to application-store module 112 by users 102 on devices 104, according to one embodiment of the present disclosure.

Application-store module 112 may receive a request to access application-store module 112 at step 802. Specifically, network interface 114 of application-store module 112 may receive the request from device 104a over network 108. The request may be associated with user 102a. Device 104a may be associated with a particular device type and may be running a particular operating system and user 102a may be associated with a particular user role. User 102a may use GUI 106a on device 104a to submit a request to access application-store module 112. For example, user 102a may click or otherwise select an icon on GUI 106a representing application-store module 112.

Application-store module 112 may determine a device type of device 104a at step 804. For example, application-store module 112 may determine a device type of device 104a based on information in the request to access application-store module 112, based on information stored in memory 118, based on any other suitable information, and/or by any other suitable method. For example, application-store module 112 may send a request to device 104a to get information about device type for device 104a and may, as a result, receive information indicating the device type for device 104a.

Application-store module 112 may determine an operating system currently running on device 104a at step 806. For example, application-store module 112 may determine an operating system currently running on device 104a based on information in the request to access application-store module 112, based on information stored in memory 118, based on any other suitable information, and/or by any other suitable method. For example, application-store module 112 may send a request to device 104a to get information about the operating system currently running on device 104a and may, as a result, receive information indicating the operating system currently running on device 104a.

Application-store module 112 may determine a user role of user 102a at step 808. For example, application-store module 112 may determine a user role of user 102a based on information in the request to access application-store module 112, based on information stored in memory 118, based on any other suitable information, and/or by any other suitable method. For example, application-store module 112 may determine a user role based on user credentials 128 and/or access credentials entered by user 102a. As another example, application-store module 112 may send a request to device 104a to get information about user role for user 102a and may, as a result, receive information indicating the user role for user 102a.

Application-store module 112 may determine whether one or more applications 126 are associated with the determined device type, operating system, and user role at step 810. For example, application-store module 112 may access information stored in logic 120 for comparison to the determined device type, operating system, and user role, to determine that one or more applications 126 are available. If application-store module 112 determines that no applications 126 are associated with the determined device type, operating system, and user role, the method may end. If application-store module 112 determines that one or more applications 126 are associated with the determined device type, operating system, and user role, the method may continue at step 812.

Application-store module 112 may send information associated with the one or more associated applications 126 at step 812. Specifically, network interface 114 of application-store module 112 may send the information to device 104a over network 108. For example, application-store module 112 may send information that may be used for display on GUI 106a to indicate applications 126 available for download by user 102a on device 104a. Application-store module 112 may also use and/or communicate information in catalog 124 to determine the display of the available applications 126 on GUI 106a. As a result, user 102a may be able to select to access one or more available applications 126.

Modifications, additions, or omissions may be made to method 800 disclosed herein without departing from the scope of the disclosure. The method may include more, fewer, or other steps. For example, the method may include additional steps for a login procedure, including receiving domain, ID/username, and/or password information from device 104a and comparing the information to user credentials 128. The method may include granting, at a first time and to first user 102a, access to application-store module 112 and denying, at a second time and to second user 102b, access to application-store module 112, based on information entered during a first and second login procedure. The method may include steps for a policy-registration procedure. For example, the first time that user 102a logs in to access application-store module 112, application-store module 112 may require user 102a to attest to certain terms of use. The method may also include steps for receiving a request to install or otherwise access available applications 126 and allowing for the install or other access based on the request. The method may also include steps for allowing an administrator to input an optional or required update to a previously accessed application 126, sending an alert to device 104a of the available or required update, receiving a response from device 104a, and taking action based on that response. For example, user 102a may have installed "Enterprise App A" on device 104a. An administrator may upload an optional update and indicate that the update is optional. In response, application-store module 112 may send an alert to device 104a for display on GUI 106a indicating that an optional update is available and providing options of installing the update or continuing without the update. An administrator may, alternatively or in addition, upload a required update and indicate that the update is required. In response, application-store module 112 may send an alert to device 104a for display on GUI 106a indicating that a required update is available and providing options of installing the update or logging out of "Enterprise App A." Additionally, steps may be performed in parallel or in any suitable order. For example, application-store module 112 may determine the user role of user 102 before determining a device type or an operating system.

According to certain embodiments of the present disclosure, disadvantages and problems associated with previous systems for managing and providing access to applications in an application-store module with applications for use on devices may be reduced or eliminated.

Certain embodiments of the disclosure may provide one or more technical advantages. For example, determining device type and operating system, determining one or more applications associated with the device type and operating system, and providing the associated applications may have the advantage of only allowing access to applications compatible with the device type and operating system being used. This may have the advantage of avoiding attempted access to incompatible applications. As another example, determining available applications based on device type, operating system, and user role may limit the processing and storage resources needed by the system by only displaying appropriate applications on a user's device.

Certain embodiments of the disclosure may also provide one or more security advantages. For example, determining user role, determining one or more applications associated with the user role, and providing the associated applications may have the advantage of only allowing access to applications to users with the appropriate user role. This may have the advantage of avoiding attempted access to applications for which a user does not have authorization.

Certain embodiments of the present disclosure may include some, all, or none of the above advantages. One or more other technical or other advantages may be readily apparent to those skilled in the art from the figures, descriptions, and claims included herein.

Although the present disclosure has been described with several embodiments, diverse changes, substitutions, variations, alterations, and modifications may be suggested to one skilled in the art, and it is intended that the disclosure encompass all such changes, substitutions, variations, alterations, transformations, and modifications as fall within the spirit and scope of the appended claims.

What is claimed is:

1. A system comprising:
   an interface connection operable to:
   receive, from a device, a request to access an application-store module, the device being associated with a first user;
   communicate a request for user credentials to the device, wherein the request for user credentials permits a selection of a corporate domain or a personal domain; and a microprocessor operable to:
   communicate to the device a request for device type information and operating system information in response to receiving the user credentials from the device;
   determine a device type associated with the device based on the requested device type information;
   determine an operating system associated with the device based on the requested operating system information;
   determine a user role associated with the first user, wherein the user role is associated with a corporate user if the user credentials are associated with the corporate domain and the user role is associated with a personal user if the user credentials are associated with the personal domain;
   determine, based on the determined device type, the determined operating system, and the determined user role, a plurality of different applications available for download onto the device; and
   communicate, to the device, a first set of information to be displayed on the device, the first set of information comprising an option to download the plurality of different determined applications onto the device.

2. The system of claim 1, wherein the interface connection is further operable to receive a request to access one of the one or more applications.

3. The system of claim 2,
   wherein the interface connection is further operable to communicate, to the device, a second set of information to be displayed on the device and operable to grant access to the one of the one or more applications;
   wherein the microprocessor is further operable to determine that an update is available for the one of the one or more applications; and
   wherein the interface connection is further operable to communicate, to the device and based on determining that the update is available for the one of the one or more applications, a third set of information to execute the update.

4. The system of claim 2,
   wherein the interface connection is further operable to communicate, to the device, a second set of information; and
   wherein the second set of information is operable to grant, at a first time, access, to the one of the one or more applications, to the first user and deny, at a second time, access, to the one of the one or more applications, to a second user.

5. The system of claim 1, wherein determining the user role is based on user credentials associated with input received during a login procedure.

6. The system of claim 1, wherein the interface connection is further operable to:
   communicate, to the device, a second set of information operable to be displayed on the device, the second set of information being associated with one or more terms of use; and
   receive, from the device, a third set of information indicating acceptance of the one or more terms of use.

7. A non-transitory computer-readable medium comprising
   logic, the logic, when executed by a processor, operable to:
   receive, from a device, a request to access an application-store module, the device being associated with a first user;
   communicate a request for user credentials to the device, wherein the request for user credentials permits a selection of a corporate domain or a personal domain;

communicate to the device a request for device type information and operating system information in response to receiving the user credentials from the device;
determine a device type associated with the device based on the requested device type information;
determine an operating system associated with the device based on the requested operating system information;
determine a user role associated with the first user, wherein the user role is associated with a corporate user if the user credentials are associated with the corporate domain and the user role is associated with a personal user if the user credentials are associated with the personal domain;
determine, based on the determined device type, the determined operating system, and the determined user role, a plurality of different applications available for download onto the device; and
communicate, to the device, a first set of information to be displayed on the device, the first set of information comprising an option to download the plurality of different determined applications onto the device.

8. The computer-readable medium of claim 7, wherein the logic, when executed by a processor, is further operable to receive a request to access one of the one or more applications.

9. The computer-readable medium of claim 8, wherein the logic, when executed by a processor, is further operable to:
communicate, to the device, a second set of information to be displayed on the device and operable to grant access to the one of the one or more applications;
determine that an update is available for the one of the one or more applications; and
communicate, to the device and based on determining that the update is available for the one of the one or more applications, a third set of information to execute the update.

10. The computer-readable medium of claim 8,
wherein the logic, when executed by a processor, is further operable to communicate, to the device, a second set of information; and
wherein the second set of information is operable to grant, at a first time, access, to the one of the one or more applications, to the first user and deny, at a second time, access, to the one of the one or more applications, to a second user.

11. The computer-readable medium of claim 7, wherein determining the user role is based on user credentials associated with input received during a login procedure.

12. The computer-readable medium of claim 7, wherein the logic, when executed by a processor, is further operable to:
communicate, to the device, a second set of information operable to be displayed on the device, the second set of information being associated with one or more terms of use; and
receive, from the device, a third set of information indicating acceptance of the one or more terms of use.

13. A method comprising:
receiving, by an interface and from a device, a request to access an application-store module, the device being associated with a first user;
communicating, by the interface and to the device, a request for user credentials wherein the request for user credentials permits a selection of a corporate domain or a personal domain;
communicating to the device, by a processor communicatively coupled to the interface, a request for device type information and operating system information in response to receiving the user credentials from the device;
determining, by the processor, a device type associated with the device based on the requested device type information;
determining, by the processor, an operating system associated with the device based on the requested operating system information;
determining, by the processor, a user role associated with the first user, wherein the user role is associated with a corporate user if the user credentials are associated with the corporate domain and the user role is associated with a personal user if the user credentials are associated with the personal domain;
determining, by the processor and based on the determined device type, the determined operating system, and the determined user role, a plurality of different applications available for download onto the device; and
communicating, by the interface and to the device, a first set of information to be displayed on the device, the first set of information comprising an option to download the plurality of different determined applications onto the device.

14. The method of claim 13, further comprising receiving, by the interface and from the device, a request to access one of the one or more applications.

15. The method of claim 14, further comprising:
communicating, by the interface and to the device, a second set of information to be displayed on the device and operable to grant access to the one of the one or more applications;
determining, by the processor, that an update is available for the one of the one or more applications; and
communicating, by the interface, to the device, and based on determining that the update is available for the one of the one or more applications, a third set of information to execute the update.

16. The method of claim 14, further comprising communicating, by the interface and to the device, a second set of information, wherein the second set of information is operable to:
grant, at a first time, access, to the one of the one or more applications, to the first user; and
deny, at a second time, access, to the one of the one or more applications, to a second user.

17. The method of claim 13, wherein determining the user role is based on user credentials associated with input received during a login procedure.

* * * * *